United States Patent [19]

Mori et al.

[11] Patent Number: 4,804,610
[45] Date of Patent: Feb. 14, 1989

[54] PROCESS FOR PRODUCING TONER BY SUSPENSION POLYMERIZATION METHOD

[75] Inventors: Hiromi Mori, Yokohama; Satoshi Matsunaga, Tokyo; Kuniko Kobayashi, Koganei; Yoshihiko Hyosu, Machida; Eiichi Imai, Narashino, all of Japan

[73] Assignee: Canon Kabushiki Kaisha, Tokyo, Japan

[21] Appl. No.: 48,928

[22] Filed: May 13, 1987

[30] Foreign Application Priority Data

May 15, 1986 [JP] Japan ................................ 61-109509

[51] Int. Cl.$^4$ ................................................ G03G 9/08
[52] U.S. Cl. .................................... 430/137; 430/106.6
[58] Field of Search ..................... 430/106.6, 110, 137; 524/524, 849, 458

[56] References Cited

U.S. PATENT DOCUMENTS

| | | | |
|---|---|---|---|
| 4,330,460 | 5/1982 | Hoffend et al. | 430/137 |
| 4,601,968 | 7/1986 | Hyosu | 430/137 |
| 4,626,489 | 12/1986 | Hyosu | 430/137 |

Primary Examiner—John L. Goodrow
Attorney, Agent, or Firm—Fitzpatrick, Cella, Harper & Scinto

[57] ABSTRACT

A process for preparing a toner obtained by a suspension polymerization method comprises stirring a mixture containing at least a polymerizable monomer containing 5 to 500 ppm of a polymerization inhibitor dissolved in the polymerizable monomer and a colorant; preparing a polymerizable monomer composition by adding a polymerization initiator to said mixture; stirring the prepared polymerizable monomer composition; and carrying out suspension polymerization of the polymerizable monomer composition dispersed in an aqueous medium.

17 Claims, No Drawings

PROCESS FOR PRODUCING TONER BY SUSPENSION POLYMERIZATION METHOD

BACKGROUND OF THE INVENTION

1. Field of the Invention

This invention relates to a process for producing a toner to be used for a method for visualizing electrostatic latent images.

2. Related Background Art

Toner is a material for forming and recording images. For example, a large number of electrophotographic methods have been known as described in U.S. Pat. No. 2,297,691. Generally speaking, by utilizing a photoconductive material, an electrostatic latent image is formed by various means on a photosensitive material, then said latent image is developed by use of a toner, and after transfer of the toner image onto a transfer member such as paper if necessary, the developed image is fixed by heating, pressure, heating pressurization or a solvent vapor to obtain a copied product. Various methods for developing of the toner and fixing toner have been proposed in the prior art and used as desired.

In the prior art, as the toner to be used for these purposes, the toner having desired particle sizes is produced generally by fusion mixing magnetic powder, a colorant such as dye or pigment into a thermoplastic resin to have them uniformly dispersed therein, cooling the kneaded product, crushing the cooled product by means of a micropulverizing device and classifying the resultant powder by means of a classifying machine.

The production process according to the crushing method can produce a considerably excellent toner, but the material for toner is limited in the scope of selection. For example, the dispersion composition of the resin and the colorant must be one which is sufficiently brittle and can be finely pulverized economically effectively. From this demand, the dispersed composition of the resin and the colorant is made brittle, and therefore particles with wide scope of particle sizes are liable to be formed when micropulverized at high speed, whereby there ensues the problem that fine particles are included therein with a relatively large proportion. Further, such brittle dispersed composition, when used in development of latent images in a image forming device such as a copying machine, is further subjected to micropulverization or powdering by mechanical shock. According to this method, it is difficult to disperse completely solid fine particles such as magnetic powder or colorant into the resin. Depending on the degree of the dispersion, it may cause increase of fog or lowering in image density, and therefore care must be paid to dispersion. By exposure of an electroconductive material such as magnetic material on the broken surface, it may sometimes become difficult to produce an insulating toner.

On the other hand, in order to overcome the problems of the toner according to these crushing methods, a process for producing a toner according to the suspension polymerization method has been proposed. In the suspension polymerization method, a monomer composition comprising a polymerizable monomer, a polymerization initiator and further optionally a crosslinking agent, a charge controller, a magnetic material, a colorant and other additives dissolved or dispersed uniformly is dispersed into an aqueous phase containing a dispersing stabilizer by means of a stirrer and polymerization reaction is carried out to obtain toner particles having desired particle sizes.

The toner obtained by such polymerization reaction requires no crushing step, and therefore has substantially no problem based on crushing such as nonuniformness of the broken surfaces by crushing and nonuniformness of shape, and the shape is also spherical as preferable for the toner.

Nonuniformness between the toner particles according to the crushing method has great influences on flowability, triboelectric charging characteristic to affect developing characteristic of the toner, changes or deterioration of the durability performance.

Since the toner obtained by the above polymerization reaction forms toner particles through polymerization of the monomer droplets of the monomer composition substantially dispersed in the aqueous phase, the toner particles are influenced by the state of the monomer droplets. Thus, it is an important problem how homogeneous is made the state of monomer droplets. For example, it is important how to make homogeneous the dispersion of the colorant in the monomer droplets, the content of the colorant, dispersion of the additives, contents of the additives, dispersion of the polymerization initiator and the content of the polymerization initiator are important factors.

In the prior art, for solving these problems, the method for treatment of a colorant or the method for adding a dispersing agent for the colorant have been proposed, but these methods were not yet satisfactory.

SUMMARY OF THE INVENTION

The present invention has been accomplished in view of the problems as mentioned above, and an object of the present invention is to provide a process for producing a toner which can give sharp image of high image density and is excellent in fixing and developing characteristics. Further, another object of the present invention is to provide a process for producing a toner which is uniform in polymerization degree and other qualities, and is also free from agglomeration with good flowability.

Still another object of the present invention is to provide a process for producing a toner obtained by polymerization of a polymerizable monomer composition in an aqueous phase, and to provide a process for producing a toner containing 5 to 500 ppm of a polymerization inhibitor in said polymerizable monomer composition.

According to the present invention, there is provided a process for preparing a toner obtained by a suspension polymerization method, comprising:

stirring a mixture containing at least a polymerizable monomer containing 5 to 500 ppm of a polymerization inhibitor dissolved in the polymerizable monomer and a colorant;

preparing a polymerizable monomer composition by adding a polymerization initiator to said mixture;

stirring the prepared polymerizable monomer composition; and carrying out suspension polymerization of the polymerizable monomer composition dispersed in an aqueous medium.

DETAILED DESCRIPTION OF THE PREFERRED EMBODIMENTS

In carrying out polymerization reaction, it is very important for the point of homogenization of the toner formed to dissolve and disperse uniformly the polymerization initiator.

For make-up of a monomer composition containing no polymerization inhibitor, in order to obtain a homogeneous toner, there has been primarily employed the method, in which a polymerization initiator is added after a colorant, wax, a charge controller and other additives are dissolved and dispersed under heating. Polymerization begins to proceed substantially at the same time as throwing of the polymerization initiator, and formation of low molecular weight products by partial polymerization and increase in viscosity by polymerization of the monomer composition are observed. For this reason, it becomes difficult to effect micropulverization by stirring in the step of forming particles by throwing into an aqueous medium, whereby there is a tendency that desirable particle size can be obtained with difficulty.

When particles are formed within a short time before no increase in viscosity occurs in order to avoid the problem of the difficulty in particle formation, the polymerization initiator is liable to be dissolved and dispersed nonuniformly. Even if desired particle size may be obtained, nonuniformness in polymerization is observed, whereby no homogeneous toner can be obtained and problems tend to occur with respect to fixing characteristic, developing characteristic, storability, off-set characteristic.

If the polymerization initiator is thrown under a low temperature after dissolution and dispersion of the colorant or wax in order to avoid these problems under heating, agglomeration of the colorant or precipitation and agglomeration of the wax are observed. Accordingly, although uniformization of the polymerization initiator may be effected, uniformization of the colorant or wax cannot be effected, whereby it is also difficult to obtain a homogeneous toner.

Although there is the method in which the monomer composition is heated before dispersed into an aqueous medium after uniformization treatment of the polymerization initiator, conventional heating method is heating from the surroundings, and therefore formation of low molecular weight products by provision of a place for partial polymerization and increase in viscosity by polymerization of the monomer can be similarly seen, whereby it is also difficult to obtain a homogeneous toner.

In view of the above problems, as the result of intensive studies to obtain a homogeneous toner, by addition of a polymerization inhibitor of a predetermined amount to the monomer composition, various problems as mentioned above can be substantially avoided to reach the method of the present invention for obtaining a homogeneous toner by uniform dissolution and dispersion of the polymerization initiator.

In the present invention, by addition of a polymerization inhibitor of a predetermined amount, the induction period until initiation of polymerization can be sufficiently taken, whereby dispersion of the polymerization initiator can be effected sufficiently without problem. As a consequence, the influence by the effect of polymerization suppression or polymerization inhibition of the polymerization inhibitor will bring about a good effect of uniform dispersion of the polymerization initiator.

The polymerization inhibitor to be used in the present invention may include the following compounds: polyhydroxy compounds: p-tert-butylcatechol, hydroquinone, catechol, hydroquinone monomethyl ether, hydroquinone monoethyl ether.

Among them, particularly preferable inhibitors are polyhydroxy compounds such as hydroquinone monomethyl ether, hydroquinone monoethyl ether, p-tert-butylcatechol for solubility in the monomer and dispersibility into the monomer composition. In styrene monomer, p-tert-butylcatechol is preferred, while in acrylic acid ester and methacrylic acid ester, hydroquinone monomethyl ether or hydroquinone monoethyl ether are preferred for the polymerization inhibition effect and the polymerization suppression effect against the polymerization initiator.

When these polymerization initiators are added in excess, the induction period for polymerization initiation is prolonged than is necessary, and also the amounts of the initiator consumed by the inhibitors and the radicals at the oligomer level in the initial stage of the reaction cannot be negligible, whereby blocking characteristic and off-set characteristic in the toner properties or fusion in the step of toner preparation are liable to be caused by these low molecular weight products. If no polymerization inhibitor is used at all or the amount of the polymerization inhibitor is too small, the induction period becomes too short, whereby the tendency to give only inhomogeneous toner as the toner properties becomes enhanced. This tendency is higher as the scale in the suspension polymerization is greater. Therefore, it is recommendable to use these polymerization inhibitors in an amount of 5 to 500 ppm, preferably 5 to 200 ppm, more preferably 5 to 150 ppm based on the monomer to be polymerized.

As the method for adding the polymerization inhibitor, there may be included the method in which each inhibitor is added in the monomer to be used; the method in which it is added as a mixture with the monomer; the method in which after dissolution and dispersion of a colorant, wax and other additives, it is added immediately before throwing of a polymerization initiator; the method in which it is added simultaneously with monomer, colorant, wax and other additives. Among these various methods, it is particularly preferable to employ the method in which the inhibitor is added in the monomer.

Examples of the polymerizable monomers applicable for the present invention may include the following vinyl monomers. That is, there may be employed styrene and its derivatives such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene and the like; ethylenically unsaturated monoolefins such as ethylene, propylene, butylene, isobutylene and the like; halogenated vinyls such as vinyl chloride, vinylidene chloride, vinyl bromide, vinyl fluoride and the like; vinyl esters such as vinyl acetate, vinyl propionate, vinyl benzoate, and the like; α-methylenealiphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate and the like; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate and the like; vinyl ethers such as vinyl methyl ether, vinyl ethyl ether, vinyl isobutyl ether and the like; vinyl ketones such as vinyl methyl ketone, vinyl hexyl ketone, methyl isopropenyl ketone and the like; N-vinyl compounds such as N-vinylpyrrole, N-vinylcarbazole, N-vinylindole, N-vinylpyrrolidone and the like; vinylnaphthalenes; acrylic acid or methacrylic acid derivatives such as acrylonitrile, methacrylonitrile, acrylamide, etc. Particularly, it is preferable to form a styrene-acrylic acid ester copolymer or a styrene-methacrylic acid ester copolymer by use of styrene monomer and an acrylic acid ester or a methacrylic acid ester. In this case, if p-tertiary-butylcatechol is dissolved at a level of 5 to 150 ppm in styrene monomer, and also hydroquinonemonomethyl ester or hydroquinonemonoethyl ether is dissolved at a level of 5 to 200 ppm in the acrylic acid ester or the methacrylic acid ester, the polymerization inhibition effect and the polymerization suppression effect will act synergetically on the polymerization initiator, whereby polymerization initiation is retarded simultaneously with inhibition of the amount of the polymer formed in the initial stage of polymerization to give a particularly good result.

During polymerization of the monomer, a polymer, a copolymer or a cyclized rubber having a polar group such as carboxylic group or amino group may be added as the additive to polymerize the monomer.

In the present invention, during polymerization, it is preferable to polymerize a polymerizable monomer composition in which a polymer, copolymer or a cyclized rubber having polar group is added by suspending said composition in an aqueous phase in which a dispersing agent of the opposite polarity to said polar polymer is dispersed. The cationic or anionic polymer, copolymer or cyclized rubber contained in the polymerizable monomer composition and the anionic or cationic dispersing agent of the opposite polarity dispersed in the aqueous phase attract each other electrostatically on the particle surface of the toner during progress of polymerization, whereby coalescence mutually between the particles is prevented by covering of the particle surface with the dispersing agent to effect stabilization. Further, since the polar polymer added during polymerization is gathered on the surface layer portion of the particle which becomes the toner, to be formed like a kind of shell, whereby the particle obtained becomes a pseudocapsule. By using a polar polymer, copolymer or cyclized rubber with a relatively high molecular weight to impart excellent properties of antiblocking property, developing characteristic and abrasion resistance to the toner particles and carrying out polymerization of a polymer with a low molecular weight in the inner portion of the particle so as to contribute to improvement of fixing characteristic, it is possible to obtain a toner satisfying the antagonistic requirements of fixing characteristic and blocking characteristic.

Polar polymers (including polar copolymers) and oppositely chargeable dispersing agents which can be used in the present invention are exemplified below.

(i) As the cationic polymer, there may be included polymers formed from nitrogen containing monomers such as dimethylaminoethyl methacrylate, diethylaminoethyl acrylate, or copolymers formed from styrene and/or an unsaturated carboxylic acid ester and said nitrogen containing monomer.

(ii) As the anionic polymer, there may be included polymers formed from nitrile type monomers such as acrylonitrile; polymers formed from a halogen type monomer such as vinyl chloride; polymers formed from unsaturated carboxylic acid such as acrylic acid, unsaturated dibasic acid, unsaturated dibasic acid anhydrides; and polymers formed from nitro type monomers.

(iii) As the anionic dispersing agent, there may be included water-soluble polymers such as partially saponified products of vinyl acetate type polymers or colloidal silica such as Aerosil #200, #300 (produced by Nippon Aerosil Co.).

(iv) As the cationic dispersing agent, there may be included aluminum oxide, magnesium hydroxide, hydrophilic positively chargeable silica fine powder such as aminoalkyl-modified colloidal silica.

In place of polar polymer, a cyclized rubber may be used.

As the magnetic particles which can be used in the present invention, materials which can be magnetized when placed in a magnetic field can be employed. For example, there may be included powders of ferromagnetic metals such as iron, cobalt, nickel, etc.; powders of alloys or compounds such as magnetite, hematite, ferrite. Magnetic fine particles having particle sizes of 0.05 to 5 $\mu$m, preferably 0.1 to 1 $\mu$m may be employed. The content of the magnetic particles may be 10 to 60 wt. %, preferably 25 to 50 wt. % based on the toner weight. These magnetic fine particles may be treated with a treating agent such as silane coupling agent, titanium coupling agent or with a resin having appropriate reactivity. In this case, although it depends on the surface area of the magnetic fine particles and the density of the hydroxyl groups existing on the surface, sufficient dispersibility can be obtained with a treated amount of 5% or less, and no bad influence is exerted on the toner properties. In the toner, a charge controller, a colorant, a flowability modifier may be also added, if necessary. The charge controller and the flowability modifier may be used as a mixer (externally added) with the toner particles. Examples of the charge controller may include metal containing dyes or nigrosine. As the colorant, dyes and pigments known in the art can be used, and they are generally used in amounts of 0.5 to 20 parts by weight based on 100 parts by weight of the monomer. Examples of the flowability modifier may include colloidal silica, fatty acid metal salts. For the purpose of increasing the amount, fillers such as calcium carbonate, fine powdery silica may be added in the toner within the range from 0.5 to 20 wt. %. Further, for improvement of flowability by preventing agglomeration mutually between the toner particles, a flowability enhancer such as Teflon fine powder may be also formulated. For the purpose of improving mold release property during hot roll fixing, waxes used as the mold release agent such as hydrocarbon compounds or carnauba wax may be also formulated in the toner.

The hydrocarbon compound to be used in the present invention may include low molecular weight paraffins or polyolefins. For example, there are Paraffin Wax (produced by Nippon Sekiyu), Paraffin Wax (produced by Nippon Seiro), Microwax (produced by Nippon Sekiyu), Microcrystalline Wax (produced by Nippon Seiro), PE-130 (produced by Hoechst), Mitsui Hiwax 110P (produced by Mitsui Sekiyu Kagaku), Mitsui Hiwax 220P (produced by Mitsui Sekiyu Kagaku), Mitsui Hiwax 660P (produced by Mitsui Sekiyu Kagaku). Particularly preferred are low molecular weight polyethylene, low molecular weight polypropylene and paraffin.

Examples of the polymerization initiator may include azobisisobutyronitrile (AIBN), benzoyl peroxide, methyl ethyl ketone peroxide, isopropyl peroxycarbonate, cumene hydroperoxide, 2,4-dichlorobenzoyl peroxide, lauroyl peroxide, 2,2′-azobis(2,4-dimethylvaleronitrile) and dimethyl-2,2′-azobisisobutyrate. As the polymerization initiator, azo type polymerization initiators are preferred. Particularly the combination of 2,2′-azobis (2,4-dimethylvaleronitrile) and dimethyl-2,2′-azobisisobutyrate is preferred with respect to stability during polymerization. Generally, about 0.5 to 5 wt. % of a polymerization initiator based on the weight of the monomer is added in the monomer composition.

These polymerization initiators may be added as such, or alternatively they may be added by dissolving in the monomer. The monomer used at this time should preferably be of the same kind as the monomer used for polymerization.

During polymerization, polymerization may be carried out in the presence of crosslinking agents as mentioned below to form a crosslinked polymer:

divinylbenzene, divinylnaphthalene, divinyl ether, divinyl sulfone, diethylene glycol dimethacrylate, triethylene glycol dimethacrylate, ethylene glycol dimethacrylate, polyethylene glycol dimethacrylate, diethylene glycol diacrylate, triethylene glycol diacrylate, 1,3-butylene glycol dimethacrylate, 1,6-hexane glycol dimethacrylate, neopentyl glycol dimethacrylate, dipropylene glycol dimethacrylate, polypropylene glycol dimethacrylate, 2,2′-bis(4-methacryloxydiethoxyphenyl)propane, 2,2′-bis(4-acryloxydiethoxyphenyl)propane, trimethylolpropane trimethacrylate, trimethylolpropane triacrylate, tetramethylolmethane tetraacrylate, dibromoneopentyl glycol dimethacrylate, allyl phthalate, 1,2-propylene glycol, 1,3-butanethiol.

These crosslinking agents, when used in a large amount, make the crosslinked polymer insoluble whereby fixing becomes inferior. If it is too small in amount used, properties such as antiblocking property and durability necessary for the toner will be worsened, whereby it becomes difficult to prevent the off-set phenomenon in which a part of the toner is not completely secured onto the paper but attached onto the roller surface in hot roll fixing. Therefore, the amount of these crosslinking agent used may be preferably 0.001 to 15 wt. % (more preferably 0.1 to 10 wt. %) based on the total amount of monomer.

The suspending method may be conducted by dispersing a monomer composition having a polymerization initiator, a colorant, a monomer and/or an additive uniformly dissolved or dispersed therein into an aqueous phase by means of a dispersing machine such as a stirrer or a homomixer or a homogenizer. Preferably, stirring speed and time are controlled so that the droplets of the monomer composition may have sizes of the toner particles, generally 30 μm or less, and thereafter stirring may be effected to the extent to prevent sedimentation of the particles so that substantially the same state may be maintained through the action of the dispersing stabilizer. Polymerization is carried out at a polymerization temperature of 50° C. or higher, generally at a temperature set at 70° to 80° C. After completion of the reaction, the toner particles formed are washed, recovered by filtration and dried. In the suspension polymerization method, 300 to 3000 parts by weight of water are generally used as the dispersing medium based on 100 parts by weight of the monomer.

Suitable dispersing medium to be used in the present invention may contain either one or a mixture of stabilizers such as polyvinyl alcohol, gelatin, methyl cellulose, methylhydropropyl cellulose, ethyl cellulose, sodium salt of carboxymethyl cellulose, polyacrylic acid and salts thereof, starch, gum alginate, zein, casein, tricalcium phosphate, talc, barium sulfate, bentonite, aluminum hydroxide, ferric hydroxide, titanium hydroxide, thorium hydroxide included in the aqueous phase. The stabilizer may be used in an amount to be stabilized in the continuous phase, preferably within the range from about 0.1 to 10 wt. %. For fine dispersion of the above inorganic dispersing agent, a surfactant within the range from 0.001 to 0.1 wt. % may be preferably used. This is use for promoting the desired action of the above dispersing stabilizer. Specific examples may include sodium dodecylbenzenesulfonate, sodium tetradecyl sulfate, sodium pentadecyl sulfate, sodium octyl sulfate, sodium allyl-alkyl-polyether sulfonate, sodium oleate, sodium laurate, sodium caprate, sodium caprylate, sodium caproate, potassium stearate, calcium oleate, sodium 3,3-disulfonediphenylurea-4,4-diazo-bis-amino-8-naphthol-6-sulfonate, ortho-carboxybenzene-azo-dimethylaniline, sodium 2,2,5,5-tetramethyl-triphenylmethane-4,4-diazobis-$\beta$-naphthol-disulfonate.

Since a monomer readily soluble in water undergoes emulsion polymerization in water at the same time to contaminate the suspension polymerization product with small emulsion polymerized particles, and therefore it is preferable to prevent emulsion polymerization in the aqueous phase by addition of a water-soluble polymerization inhibitor (e.g. a metal salt). For preventing coalescence of the particles by increasing the viscosity of the medium, it is also preferable to add glycerine, glycol into water. For reducing the solubility of a readily soluble monomer in water, it is also possible to use a salt such as NaCl, KCl, $Na_2SO_4$.

The present invention is described in detail by referring to Examples.

Example 1

| | |
|---|---|
| Styrene | 150 g |
| (added previously with 5 ppm or hydroquinone) | |
| n-Butyl methacrylate | 50 g |
| (added previously with 10 ppm of hydroquinone) | |
| Styrene-dimethylaminoethyl methacrylate copolymer | 20 g |
| (monomer weight ratio 9:1, $\bar{M}n$ = 20000) | |
| Paraffin wax 155° F. | 8 g |
| (produced by Nippon Seiro) | |
| Hydrophobic magnetic material [BL-270 (produced by Titanium Kogyo)] | 120 g |
| Vinyl type crosslinking agent [NK ester 4G (produced by Shin Nakamura Kagaku)] | 2 g |

The above recipe was dissolved and dispersed by heating to 70° C. in a vessel. The dispersion obtained in a vessel equipped with a T.K. system homomixer (produced by Tokushu Kika Kogyo) which is a mixing device having high shearing force was mixed for about 5 minutes while being maintained at 70° C. Further, 6 g of azobisisobutyronitrile was added to the dispersion, and dispersion and mixing were conducted by use of a sand mill for 15 minutes to prepare a monomer composition.

Separately, a 2-liter flask containing one liter of an aqueous dispersion having 4 g of Aerosil 200 (produced by Nippon Aerosil) dispersed therein was heated to 70° C., and the above monomer composition was thrown thereinto and stirred by use of the T.K. system homomixer at 7000 rpm for 20 minutes. Further, the mixture was stirred at low rotational number by use of a stirring machine having paddle stirring blades to complete polymerization over 24 hours. After the dispersing agent was removed, filtration, water washing and drying were conducted to obtain a toner. The toner obtained had a mean particle size of 11 μm, a sharp particle size distribution (with the content of coarse particles of 20.2 μm or greater being 3 wt. % or less).

To 100 g of the toner obtained, 0.4 g of a wet silica [Nipsil ER (produced by Nippon Silica)] was added to provide a developer. When image formation was effected by use of a commercially available copying machine PC-20 (produced by Canon), good images were obtained with good off-set and fixing characteristics. Also, in successive copying tests of 3000 sheets, no deterioration in image quality and density was observed.

Example 2

| | |
|---|---|
| Styrene (added previously with 40 ppm of p-tert-butylcatechol) | 150 g |
| 2-Ethylhexyl methacrylate (added previously with 100 ppm of hydroquinone-monomethyl ether) | 50 g |
| Cyclized rubber [CK-450 (produced by Hoechst)] | 20 g |
| Paraffin wax 155° F. (produced by Nippon Seiro) | 8 g |
| Hydrophobic magnetic material [BL-270 (produced by Titanium Kogyo)] | 160 g |
| Vinyl type crosslinking agent [BPE-200 (produced by Shin Nakamura Kagaku)] | 4 g |

The above recipe was dissolved and dispersed by heating to 70° C. in a vessel. This was mixed in a vessel equipped with a T.K. system homomixer (produced by Tokushu Kika Kogyo) for about 5 minutes while maintained at 70° C., and further 6 g of azobisisobutyronitrile was added to be dissolved therein. This was dispersed and dissolved under high speed stirring by use of homomixer for 20 minutes to prepare a monomer composition.

On the other hand, a 2 liter flask containing a dispersion of 10 g of silica treated with aminoalkylsilane dispersed in one liter of water was heated to 70° C., and the above monomer composition was thrown thereinto and the mixture was stirred by use of a T.K. system homomixer at 7000 rpm for 20 minutes. Further, the mixture was stirred at low rotational number by use of a stirrer having paddle stirring blades to complete polymerization over 24 hours. After removal of the dispersing agent, filtration, water washing and drying were conducted to obtain a toner. The toner had a mean particle size of 10 μm and a sharp particle size distribution (with the content of coarse particles of 20.2 μm being 3 wt. % or less).

To 100 g of the toner obtained was added 0.4 g of a hydrophobic silica [Tullanox 500 (produced by Talco Co.)] to provide a developer. When image formation was effected by a commercially available copying machine NP-270RE (produced by Canon), good images were obtained with good off-set and fixing characteristics. Also, in successive copying tests of 3000 sheets, no deterioration in image quality and density was observed.

Example 3

| | |
|---|---|
| Styrene (added previously with 100 ppm of hydroquinonemonomethyl ether) | 150 g |
| 2-Ethylhexyl methacrylate (added previously with 200 ppm of hydroquinonemonomethyl ether) | 50 g |
| Styrene-dimethylaminoethyl methacrylate copolymer (monomer weight ratio 9:1, $\overline{Mn}$ = 20000) | 20 g |
| Parraffin wac 155° F. (produced by Nippon Seiro) | 8 g |
| Phthalocyanine blue | 20 g |
| Vinyl type crosslinking agent [NK-4G (produced by Shin Nakamura Kagaku)] | 2 g |

By use of the above formulation, polymerization was carried out according to the same method as in Example 1 to obtain a blue toner with a mean particle size of 10 μm (the content of coarse particles 20.2 μm or more being 2 wt. % or less). To 100 g of this toner was added 1000 g of iron powder carrier to provide a developer. When image formation was effected by use of said developer according to the two-component magnetic brush developing method, good images were obtained with good of said and fixing characteristics. Also, in successive copying tests of 3000 sheets, no deterioration in image quality and density was observed.

Example 4

| | |
|---|---|
| Styrene (added previously with 15 ppm of p-tert-butylcatechol) | 170 g |
| 2-Ethylhexyl methacrylate (added previously with 25 ppm of hydroquinonemonomethyl ether) | 30 g |
| Cyclized rubber [CK-450 (produced by Hoechst)] | 20 g |
| Paraffin wax 155° F. (produced by Nippon Seiro) | 4 g |
| Hydrophobic magnetic material [BL-200 (produced by Titanium Kogyo) treated with titanium coupling agent KR-138S (produced by Ajinomoto)] | 140 g |
| Vinyl type crosslinking agent [BPE-200 (produced by Shin Nakamura Kagaku)] | 4 g |

The above recipe was dissolved and dispersed by heating to 70° C. in a vessel. The dispersion obtained was mixed in a vessel equipped with a T.K. system homomixer (produced by Tokushu Kika Kogyo) as the mixing device for about 5 minutes while being maintained at 70° C., and further 6 g of azobisisobutyronitrile was added, followed by dispersing and mixing by an attritor for 10 minutes to prepare a monomer composition. On the other hand, by use of the same dispersing medium as in Example 1, polymerization was carried out to obtain a toner with a mean particle size of 10 μm (the content of coarse particles of 20.2 μm or higher being 3 wt. % or less).

To 100 g of this toner was added 0.4 g of a hydrophobic silica [Tullanox 500 (produced by Talco Co.)] to provide a developer. When image formation was effected by use of a commercially available copying machine NP-270RE (produced by Canon), good images were obtained with good off-set and fixing characteristics. Also in successive copying test of 3000 sheets, no deterioration in image quality and density was observed.

COMPARATIVE EXAMPLE 1

In the recipe of Example 1, by use of a monomer composition without addition of the polymerization inhibitor, the same dispersing and mixing as in Example 1 were conducted. During dispersing and mixing by use of a sand mill after addition of the polymerization initiator (10 minutes after addition of the polymerization initiator), viscosity increase was observed, and although the toner was obtained, its mean grain size was great as 15 μm with the content of coarse particles of 20.2 μm being about 10 wt. %. When the same externally added image formation was effected as in Example 1, the toner image obtained was inferior as compared with Example 1.

COMPARATIVE EXAMPLE 2

In the recipe of Example 2, polymerization was carried out by increasing p-tert-butylcatechol added to styrene to 1000 ppm and hydroquinone monomethyl ether added to 2-ethylhexyl methacrylate to 1000 ppm. As the result, 20 minutes after addition of the polymerization initiator, although no viscosity increase of the monomer composition was observed, polymerization reaction was found to be incomplete when taken out after the same polymerization reaction time as in Example 2 and fusion occurred at the stage of filtration of the product. Thus, the product could be used as the toner with difficulty.

The changes in liquid temperature with lapse of time of the monomer compositions after addition of the polymerization initiator are shown in the following Table. The polymerization reaction proceeds as the liquid temperature is elevated, thus suggesting increase in viscosity of the monomer composition.

| Example Nos. | Stirring time | | | | |
|---|---|---|---|---|---|
| | 0 (min) | 5 (min) | 10 (min) | 15 (min) | 20 (min) |
| Example 1 | 70 (°C.) | 70 (°C.) | 71~72 (°C.) | 72~73 (°C.) | — |
| Example 2 | 70 (°C.) | 70 (°C.) | 70 (°C.) | 71 (°C.) | 71~72 (°C.) |
| Example 3 | 70 (°C.) | 70 (°C.) | 71~72 (°C.) | 72~73 (°C.) | — |
| Example 4 | 70 (°C.) | 70 (°C.) | 71 (°C.) | — | — |
| Comparative Example 1 | 70 (°C.) | 70 (°C.) | 75 (°C.) | 80 (°C.) | — |

Example 5

| | |
|---|---|
| Styrene (added previously with 15 ppm or p-tert-butylcatachol) | 3400 g |
| 2-Ethylhexyl methacrylate (added previously with 25 ppm of hydroquinone-monomethyl ether) | 600 g |
| Cyclized rubber [CK-450 (produced by Hoechst)] | 400 g |
| Paraffin wax 155° F. (produced by Nippon Seiro) | 80 g |
| Carbon black [Stering ® (produced by Cabot Co.)] | 100 g |
| Vinyl type crosslinking agent [BPE-200 (produced by Shin Nakamura Kagaku)] | 80 g |

The above composition was dissolved by heating to 70° C. in a vessel and dispersed by an attritor for 4 hours.

Further, with addition of 240 g of 2,2'-azobis-(2,4-dimethyl-valeronitrile) and 20 g of dimethyl-2,2'-azobisisobutyrate, the mixture was dispersed and mixed by an attritor for 15 minutes to prepare a monomer composition. Carbon black was found to be homogeneously dispersed in the monomer composition.

On the other hand, a vessel containing a dispersion of 150 g of silica treated with aminoalkylsilane dispersed in 20 liter of water was heated to 70° C., and the above monomer composition was thrown thereinto and the mixture was stirred by use of a T.K. system homomixer at 7000 rpm for 20 minutes. Further, the mixer was stirred at a low rotational number by use of a stirrer having paddle stirring blades to complete polymerization over 24 hours. After removal of the dispersing agent, filtration, water washing and drying were conducted to obtain a toner. This toner was found to have a mean particle size of 10 μm and a sharp particle size distribution (with the content of coarse particles of 20.2 μm or higher being 2 wt. % or less).

To 100 g of this toner was added 0.4 g of a hydrophobic silica [Tullanox 500 (produced by Talco Co.)] to provide a developer. When image formation was effected by use of a commercially available copying machine NP-270RE (produced by Canon), good images were obtained with good off-set and fixing characteristics. Also, in successive copying tests of 3000 sheets, no deterioration in image quality and density was observed.

COMPARATIVE EXAMPLE 3

When Example 5 was repeated except for using no polymerization inhibitor, the obtained toner had a mean particle size of 13 μm and the content of the coarse particles of 20.2 μm or more was about 7 wt. %, thus exhibiting a particle size distribution of the toner which is broader as compared with the toner of Example 5.

Example 6

Suspension polymerization was carried out in the same manner as in Example 5 except for using only 240 g of dimethyl-2,2'-azobisisobutyrate as the polymerization initiator and changing the liquid temperature during stirring to 70° C. A toner having a mean particle size of 9 μm with a sharp particle size distribution was obtained.

What is claimed is:

1. A process for preparing a toner obtained by a suspension polymerization method, comprising:
    stirring a mixture containing at least a polymerizable monomer containing 5 to 500 ppm of a polymerization inhibitor dissolved in the polymerizable monomer and a colorant;
    preparing a polymerizable monomer composition by adding a polymerization initiator to said mixture;
    stirring the prepared polymerizable monomer composition; and
    carrying out suspension polymerization of the polymerizable monomer composition dispersed in an aqueous medium.

2. A process according to claim 1, wherein the polymerizable monomer is a vinyl monomer.

3. A process according to claim 2, wherein the polymerizable monomer comprises styrene monomer and an acrylic acid ester.

4. A process according to claim 2, wherein the polymerizable monomer comprises styrene monomer and a methacrylic acid ester.

5. A process according to claim 1, wherein 5 to 200 ppm of the polymerization inhibitor is contained.

6. A process according to claim 5, wherein 5 to 150 ppm of the polymerization inhibitor is contained.

7. A process according to claim 5, wherein the polymerization inhibitor is a polyhydroxy compound.

8. A process according to claim 7, wherein the polymerization inhibitor is p-tertiary-butylcatechol.

9. A process according to claim 7, wherein the polymerization inhibitor is hydroquinone monomethyl ether or hydroquinone monoethyl ether.

10. A process according to claim 1, wherein the polymerization initiator is 2,2'-azobis(2,4-dimethylvaleronitrile), dimethyl-2,2'-azobisisobutyrate, or a mixture of 2,2'-azobis(2,4-dimethyl-valeronitrile) and dimethyl-2,2'-azobisisobutyrate.

11. A process according to claim 1, wherein the colorant is carbon black or a magnetic material.

12. A process according to claim 1, wherein the polymerizable monomer composition contains a polar polymer or a cyclized rubber.

13. A process according to claim 1, wherein the polymerizable monomer composition contains a crosslinking agent.

14. A process according to claim 1, wherein the aqueous medium is used in an amount of 300 to 3000 parts by weight per 100 parts by weight of the polymerizable monomer.

15. A process according to claim 14, wherein the aqueous medium contains an inorganic dispersing agent which is difficulty soluble in water.

16. A process according to claim 1, wherein the polymerizable monomer composition contains a polar polymer or a cyclized rubber and the aqueous medium contains a difficulty water-soluble inorganic dispersing agent of the polarity opposite to that of said polar polymer or cyclized rubber.

17. A process according to claim 7, wherein the polymerization initiator is hydroquinone.

* * * * *

UNITED STATES PATENT AND TRADEMARK OFFICE
CERTIFICATE OF CORRECTION

PATENT NO. : 4,804,610
DATED : February 14, 1989
INVENTOR(S) : HIROMI MORI, ET AL.

It is certified that error appears in the above-identified patent and that said Letters Patent is hereby corrected as shown below:

COLUMN 10

Line 29, "of said" should read --off-set--.

COLUMN 14

Line 15, "difficulty" should read --difficultly--.
    Line 19, "difficulty" should read --difficultly--.

Signed and Sealed this

Third Day of July, 1990

*Attest:*

HARRY F. MANBECK, JR.

*Attesting Officer*      *Commissioner of Patents and Trademarks*